(12) United States Patent  
Ivanov et al.

(10) Patent No.: US 9,179,174 B2  
(45) Date of Patent: Nov. 3, 2015

(54) METHOD AND APPARATUS FOR GENERATING MEDIA CONTENT

(71) Applicant: AT&T Intellectual Property I, LP, Atlanta, GA (US)

(72) Inventors: Aleksey Ivanov, Middletown, NJ (US); Andrea Basso, Turin (IT); Tara Hines, New York, NY (US); Jeffrey Mikan, Atlanta, GA (US); Nadia Morris, Pacifica, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 14/196,702

(22) Filed: Mar. 4, 2014

(65) Prior Publication Data

US 2014/0189773 A1    Jul. 3, 2014

Related U.S. Application Data

(63) Continuation of application No. 13/193,166, filed on Jul. 28, 2011, now Pat. No. 8,756,641.

(51) Int. Cl.
| | |
|---|---|
| H04N 7/173 | (2011.01) |
| H04N 21/41 | (2011.01) |
| H04N 21/45 | (2011.01) |
| H04N 21/466 | (2011.01) |
| H04N 21/4788 | (2011.01) |
| H04N 21/422 | (2011.01) |
| H04W 4/02 | (2009.01) |

(52) U.S. Cl.
CPC ......... *H04N 21/4104* (2013.01); *H04N 21/422* (2013.01); *H04N 21/4524* (2013.01); *H04N 21/4668* (2013.01); *H04N 21/4788* (2013.01); *H04W 4/02* (2013.01)

(58) Field of Classification Search  
CPC combination set(s) only.  
See application file for complete search history.

(56) References Cited

U.S. PATENT DOCUMENTS

| | | | |
|---|---|---|---|
| 7,840,558 B2 | 11/2010 | Wiseman et al. | |
| 8,060,571 B2 | 11/2011 | Rao | |
| 8,417,569 B2 | 4/2013 | Gross | |
| 2007/0199019 A1 | 8/2007 | Angiolillo | |

(Continued)

OTHER PUBLICATIONS

"flickr", www.flickr.com; Jul. 28, 2011.

(Continued)

*Primary Examiner* — Chenea Smith  
(74) *Attorney, Agent, or Firm* — Guntin & Gust, PLC; Jay H. Anderson

(57) ABSTRACT

A system that incorporates teachings of the present disclosure may include, for example, a storage medium including computer instructions to receive sensory information at a media device from a first mobile communication device where the first mobile communication device obtains at least a portion of the sensory information from at least one second mobile communication device in response to a broadcast by the first mobile communication device of a wireless signal representing a notice to obtain the sensory information, where the sensory information is associated with an environment of the first mobile communication device, and where the sensory information comprises images of the environment. The computer instructions can enable generating a plurality of personal content utilizing at least a portion of the sensory information, where each of the plurality of personal content includes some of the images captured at different perspectives. Other embodiments are disclosed.

20 Claims, 9 Drawing Sheets

(56) References Cited

U.S. PATENT DOCUMENTS

| | | |
|---|---|---|
| 2007/0299976 A1 | 12/2007 | Zafar |
| 2008/0012935 A1* | 1/2008 | Echtenkamp .............. 348/14.02 |
| 2008/0071594 A1 | 3/2008 | Morin |
| 2008/0240702 A1 | 10/2008 | Wassingbo et al. |
| 2009/0009605 A1 | 1/2009 | Ortiz |
| 2009/0063991 A1 | 3/2009 | Baron et al. |
| 2009/0133051 A1 | 5/2009 | Hildreth |
| 2009/0233572 A1* | 9/2009 | Basir ......................... 455/404.1 |
| 2009/0268888 A1 | 10/2009 | Hsu et al. |
| 2010/0009700 A1* | 1/2010 | Camp et al. ............... 455/456.6 |
| 2010/0076851 A1 | 3/2010 | Jewell |
| 2010/0076968 A1 | 3/2010 | Boyns et al. |
| 2010/0145763 A1 | 6/2010 | Swanson, Sr. |
| 2010/0149303 A1 | 6/2010 | Thorne et al. |
| 2010/0235429 A1 | 9/2010 | Simonen et al. |
| 2010/0333210 A1* | 12/2010 | Fisher et al. .................... 726/26 |
| 2011/0064281 A1 | 3/2011 | Chan |
| 2011/0161999 A1 | 6/2011 | Klappert et al. |
| 2011/0165841 A1 | 7/2011 | Baek et al. |
| 2011/0184953 A1* | 7/2011 | Joshi et al. ..................... 707/738 |
| 2011/0238828 A1* | 9/2011 | Grigsby et al. ............... 709/224 |
| 2012/0167124 A1 | 6/2012 | Abdeljaoued |
| 2012/0206319 A1 | 8/2012 | Lucero et al. |
| 2013/0015946 A1 | 1/2013 | Lau et al. |
| 2013/0124508 A1* | 5/2013 | Paris et al. ..................... 707/723 |

OTHER PUBLICATIONS

Burbn, Inc., "Instagram, Fast Beautiful Photo Sharing for your iPhone", 2 pages, http://instagr.am/, Web site last visited Jul. 28, 2011.

Yahoo, Inc., "Flickr Tour", 1 page, http://www.flickr.com/tour/10, Web site last visited Jul. 28, 2011.

Youtube, LLC, "Broadcast Yourself", 2 pages, http://www.youtube.com, Web site last visited Jul. 28, 2011.

* cited by examiner

600

METHOD AND APPARATUS FOR GENERATING MEDIA CONTENT

CROSS-REFERENCE TO RELATED APPLICATIONS

This application is a continuation of U.S. patent application Ser. No. 13/193,166 filed Jul. 28, 2011, which is incorporated herein by reference in its entirety.

FIELD OF THE DISCLOSURE

The present disclosure relates generally to media content and more specifically to generating the media content.

BACKGROUND

Media content is generally experienced by consumers via devices such as computers, televisions, radios, and mobile electronics. Media content is frequently delivered by service providers, who send media content, such as television programming, radio, and video, directly to consumers for enjoyment at their physical location. Service providers also often provide access to the internet and to internet-based media content, such as websites, games, social networking, and virtual-reality applications. Consumers often desire to customize media content and share that content with others.

DETAILED DESCRIPTION

Figure 1:
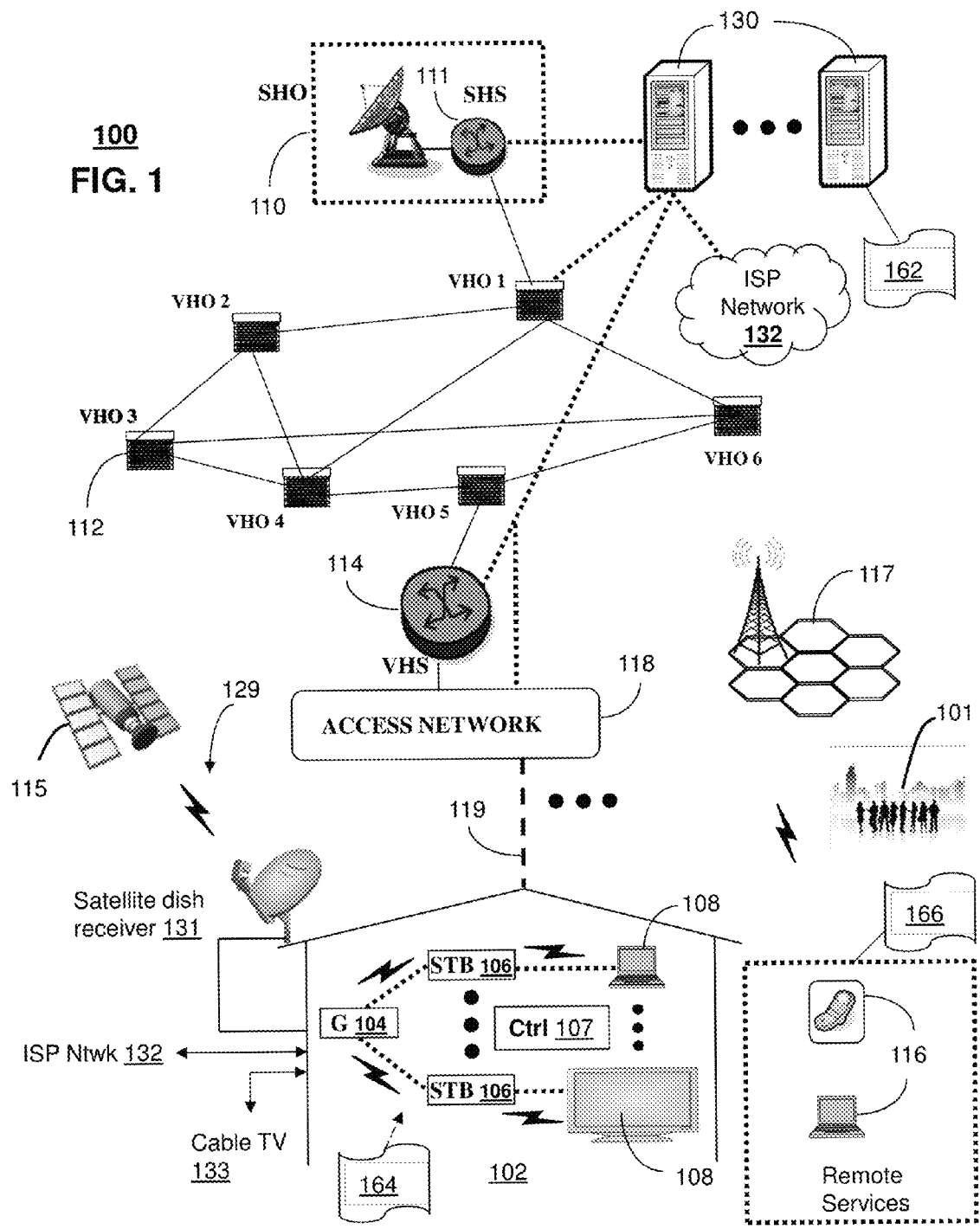
FIGS. 1-2 depict illustrative embodiments of communication systems that provide media services.

The present disclosure describes, among other things, illustrative embodiments for generating media content utilizing a mobile communication device, where the media content is associated with an environment. The mobile communication device can retrieve sensory information associated with the environment from a sensor device coupled with the mobile communication device, including still or moving images of the environment. The sensory information can be utilized to generate a plurality of personal content, where each of the personal content includes at least some images captured at different perspectives. The different personal content can be selectively accessed by different parties, such as based on a relationship between the requesting party and the user that generated the personal content.

The mobile communication device can broadcast a notice to obtain other sensory information associated with the environment from one or more other mobile communication devices and one or more fixed communication devices that have captured the other sensory information associated with the environment. In one example, the devices can exchange sensory information so that each device can generate its own media content. The devices can negotiate with each other for access to the sensory information. This application incorporates by reference U.S. application Ser. No. 13/193,019 entitled "METHOD AND APPARATUS FOR GENERATING MEDIA CONTENT."

In one or more embodiments, the devices can anonymously provide access to the sensory information. In one or more embodiments, the media content can be generated into three dimensional (3D) media content, such as based on images captured by different devices from different perspectives. The access to the sensory information can be shared so that a first device receives sensory information via a second device where the sensory information was captured by a third device and where the first and third devices do not need to communicate with each other to share the sensory information. The media content can be generated by the mobile communication device and/or can be generated by another device, such as a remote server which receives the sensory information from the mobile communication device. Other embodiments are contemplated by the present disclosure.

One embodiment of the present disclosure includes a media device having a memory and a processor coupled to the memory. The processor can be operable to receive sensory information from a first mobile communication device, where the first mobile communication device obtains at least a portion of the sensory information from at least one second mobile communication device and at least one fixed communication device in response to a broadcast by the first mobile communication device of a wireless signal representing a notice to obtain the sensory information. The sensory information can be associated with an environment of the first mobile communication device. The sensory information can include images of the environment. The first mobile communication device can be associated with a user. The processor can also be operable to receive criteria for generating personal content and generate a plurality of personal content utilizing at least a portion of the sensory information based on the criteria, where each of the plurality of personal content includes some of the images captured at different perspectives. The processor can further be operable to receive a request for presentation of the plurality of personal content, the request being associated with a requestor, determine a relationship between the requestor and the user, and provide for display on a presentation device, one personal content of the plurality of personal content based on a relationship between the requestor and the user.

One embodiment of the present disclosure is a method including obtaining sensory information at a media device from a group of communication devices, where a first mobile communication device of the group of communication devices obtains at least a portion of the sensory information from at least one second mobile communication device in response to a broadcast by the first mobile communication device of a wireless signal representing a notice to obtain the sensory information. The sensory information can be associated with an environment of the first mobile communication device. The sensory information can include images of the environment. The first mobile communication device can be associated with a user. The method can also include generating at the media device, a plurality of personal content utilizing at least a portion of the sensory information, where each of the plurality of personal content includes some of the images captured at different perspectives. The method can further include receiving at the media device, a request for presentation of the plurality of personal content, the request being associated with a requestor. The method can include determining at the media device, a relationship between the requestor and the user, and providing at the media device for display on a presentation device, one personal content of the plurality of personal content based on a relationship between the requestor and the user.

One embodiment of the present disclosure includes a non-transitory computer-readable storage medium which includes computer instructions to receive sensory information at a media device from a first mobile communication device, where the first mobile communication device obtains at least a portion of the sensory information from at least one second mobile communication device in response to a broadcast by the first mobile communication device of a wireless signal representing a notice to obtain the sensory information. The sensory information can be associated with an environment of the first mobile communication device. The sensory information can comprise images of the environment. At least a portion of the sensory information obtained by the first mobile communication device from the at least one second mobile communication device can be in exchange for other sensory information captured by a sensory device coupled with the first mobile communication device. The computer instructions can enable generating a plurality of personal content utilizing at least a portion of the sensory information, where each of the plurality of personal content includes some of the images captured at different perspectives.

FIG. 1 depicts an illustrative embodiment of a first communication system 100 for delivering media content. The communication system 100 can generate media content related to an environment 101, such as a concert, a sporting event, a user walking through a shopping mall, a user playing at a park, and so forth. The communication system 100 can generate the media content by capturing different sensory information from different communication devices that are in proximity to the environment 101. The sensory information can include still or moving images, and can include other types of sensory information such as temperature, weather, lighting, color, audio, location information, time, season of the year, aroma associated with the environment, and so forth. The communication system 100 can allow mobile devices to selectively exchange sensory information, including in a daisy chain fashion where devices indirectly share sensory information via other devices without direct communication, so that the mobile devices can enhance their access to sensory information of the environment 101. The system 100 can allow for generating different versions of personal content from the sensory information, such as from different perspectives, different people speaking and so forth. Sharing of the personal content can be based on a number of factors, including a relationship between the requestor and the user that generated the content.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent in whole or in part, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia content, including broadcast content, via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

The embodiments of the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or portable communication devices 116.

Multiple forms of media services can be offered to media devices over landline technologies in communication system 100 such as through the devices and/or techniques described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a sensory information server (herein referred to as server 130). The server 130 can use common computing and communication technology to perform function 162, which can include among things, coordinating the gathering of sensory information from different mobile and fixed communications devices in proximity to the environment 101.

The server 130 can be used to receive sensory data representing characteristics of an environment of a source device, such as one of the mobile communication devices 116. The server 130 can also be used to facilitate the gathering of the sensory data, such as providing a platform for exchanging sensory data between mobile communication devices and/or providing a platform for negotiating obtaining media content, such as from a commercial entity that is capturing images of an event occurring in the environment (e.g., images of a baseball game).

In one or more embodiments, the server 130 can be used for generating media content based on sensory information captured by the group of communication devices (e.g., mobile and/or fixed communication devices). For instance, the server 130 can generate media content that shows various images of the environment, including as a live scrap book of the user. The media content can be generated by various devices, including the server 130, the mobile device 116, the STB 106 or other devices of the communication system 100.

The media content can present the environment at various viewing angles and/or at a selected viewing angle. In one embodiment, the live scrap book can be presented at a viewing angle designated by a user (such as in a user profile) and can further allow access to other viewing angles when the user desires, such as pausing the presentation of the live scrap book so that the other viewing angles can be presented. The sensory information also enables utilizing different sensory data from different devices to further enhance the media content. For example, images can be captured from a far distance to an event of the environment (e.g., a football game) by a first communication device to allow capturing a view of all of the players in the football game while audio can be captured from a close distance to the field of the football game by a second communication device to allow hearing the event as if the user were present on the field of the football game.

In one embodiment, portions of the sensory information can be filtered based on quality. For instance, audio content can be compared and selected, including utilizing only portions of a first audio content and combining it with portions of a second audio content, so that the audio associated with the environment has more clarity. Other criteria can also be utilized for filtering portions of the sensory information. In one example, the sensory information can be filtered based on accuracy. For example, if the sensory information is temperature then a temperature reading that is believed to be inaccurate, such as based on a comparison with other sensory information or based on a location of the temperature sensor being too close to a heat source, can be ignored. As another example, parental controls, user preferences, digital rights management and so forth can be utilized in determining whether captured sensory information should be filtered out of the generation of the media content. For instance, images of portions of events (e.g., actions occurring in an audience of the event in the environment 101) that are inappropriate for children can be filtered out of the media content. The filtering can be based on user preferences, information stored in a user profile, monitored consumption of a user and so forth.

The media processors 106 and mobile communication devices 116 can be adapted with software functions 164 and 166, respectively, to further utilize the services of the server 130. For example, the media processors 106 and portable communication devices 116 can be adapted to execute software functions 164 and 166, respectively, to collect and report sensory data to the server 130 representing characteristics of the environments of the media processors 106 and mobile communication devices 116, respectively. In one embodiment, the software functions 166 can include retrieving sensory information from a sensor device coupled with the mobile communication device 116. The sensor device can be a camera, such as integrated with the mobile communication device 116 or in communication therewith via wireless and/or tethered communication. Other types of sensor devices can also be utilized, including audio recorders, temperature sensors, location detectors, and so forth.

In one embodiment, the sensory information can be provided to the media processor 106 for generating personal content, including a plurality of different versions of the personal content. The different versions can be based on criteria established by the user, such as a version for family and a version for friends. The different versions can highlight different people, different audio, different objects and so forth. Other variations of the versions can include different supplemental content being added to the personal content, such as different background music or different tags for tangential information related to the environment. For example, a family version may include tags that provide links or other information to similar family outings where as a friend's version may provide links or other information to particular friends and their personal information.

Figure 2:
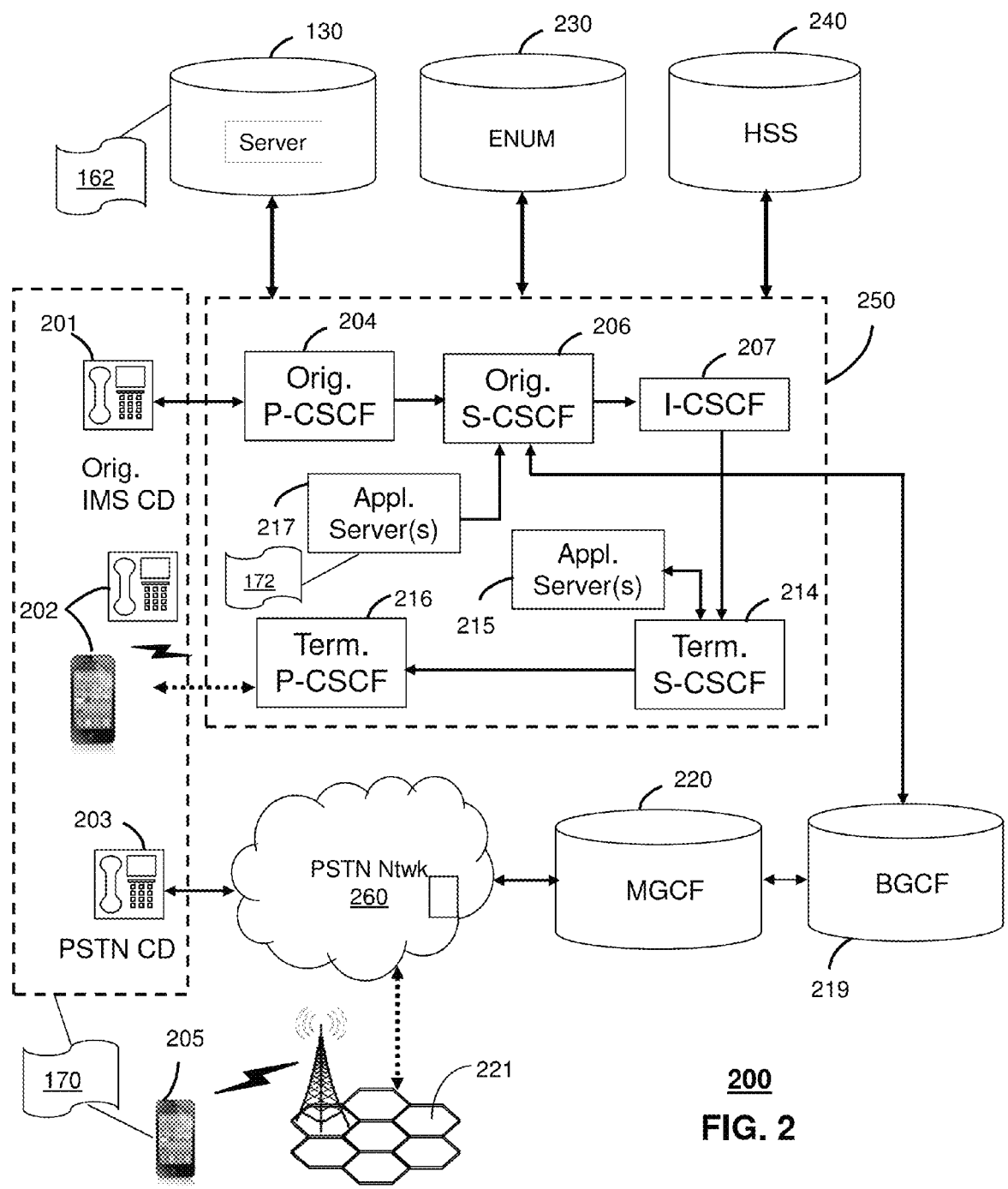

FIG. 2 depicts an illustrative embodiment of a communication system 200 employing IP Multimedia Subsystem (IMS) network architecture to facilitate the combined services of circuit-switched and packet-switched systems. Communication system 200 can be overlaid or operably coupled with communication system 100 as another representative embodiment of communication system 100.

The communication system 200 can generate media content related to an environment in proximity to one or more of the mobile communication devices of the system. The communication system 200 can generate the media content by capturing different sensory information from different communication devices that are in proximity to the environment. The sensory information can include still or moving images, and can include other types of sensory data such as temperature, weather, lighting, color, audio, location information, time, season of the year, aroma associated with the environment, and so forth. The communication system 200 allows mobile devices to selectively exchange sensory information, including in a daisy chain fashion where devices indirectly share sensory information via other devices without direct communication, so that the mobile devices can enhance their access to sensory information of the environment. The communication system 200 also allows users providing and/or receiving sensory information to remain anonymous. Communication system 200 enables exchange of the sensory information via packet-switched and circuit-switched communication technologies.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1, including the sensory information gathered from various mobile device in proximity to an event or environment. It is further contemplated that the CDs of FIG. 2 can operate as wireline and/or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled with server 130 of FIG. 1 for purposes similar to those described above. It is further contemplated by the present disclosure that the server 130 can perform the function 162 and thereby facilitate gathering of sensory information and/or generating media content based on gathered sensory information for subscribers associated with CDs 201, 202, 203, and 205. CDs 201, 202, 203, and 205 can be adapted with software to perform function 170 to utilize and integrate with the media content generation and/or sensory information gathering performed by the server 130. It is further contemplated that the server 130 can be an integral part of the application server(s) 217, where the application server(s) 217 performs function 172, which can be substantially similar to function 162 and adapted to the operation of the IMS network 250.

Figure 3:
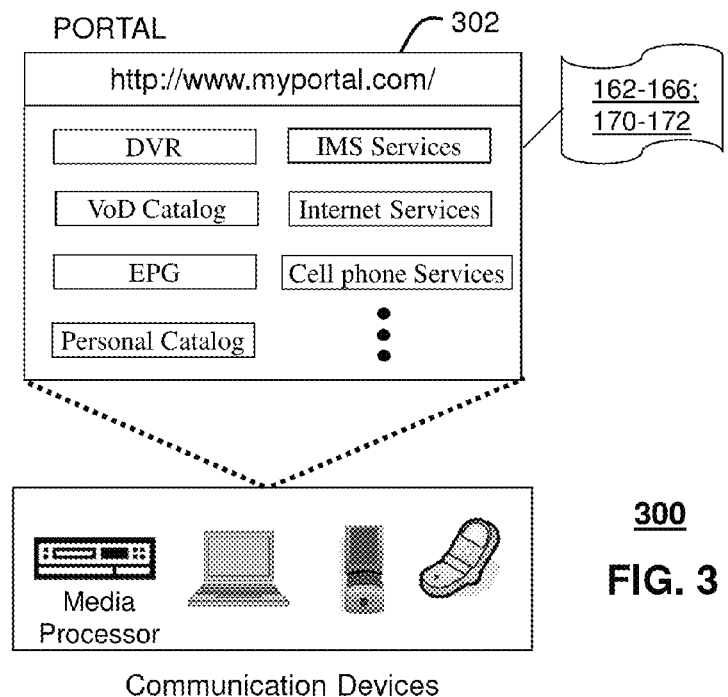
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier. In one embodiment, web portal 302 can be utilized for selecting the notice signal that is broadcast by the mobile communication device to obtain sensory information from other communication devices. As an example, a user can access the web portal 302 via a web browser operating on a mobile communication device 116. The web portal can be utilized for selecting a strength of the wireless signal that is to be broadcast, where the selection can be based on the characteristics of the environment. For instance, the strength of the broadcast signal can be based on the size of the environment so that the broadcast is being received by other mobile communication devices that are in proximity to the environment rather than mobile communication devices that are too far from the environment to provide any useful sensory information. While this embodiment describes use of the web portal to select the signal strength, the exemplary embodiments can also select the signal strength without use of the web portal, such as based on an analysis made by the processor of the mobile communication device. The analysis can be based on characteristics of the environment that are detected or otherwise determined by the mobile communication device, such as using GPS location information to determine that a stronger signal is needed because the environment includes numerous obstructions such as buildings. The analysis can also be based on inputs of a user such as a type of environment (e.g., a soccer stadium), size of environment, location of environment, type of location (open areas rather than a city with buildings obstructing the wireless broadcast), and so forth.

Figure 4:
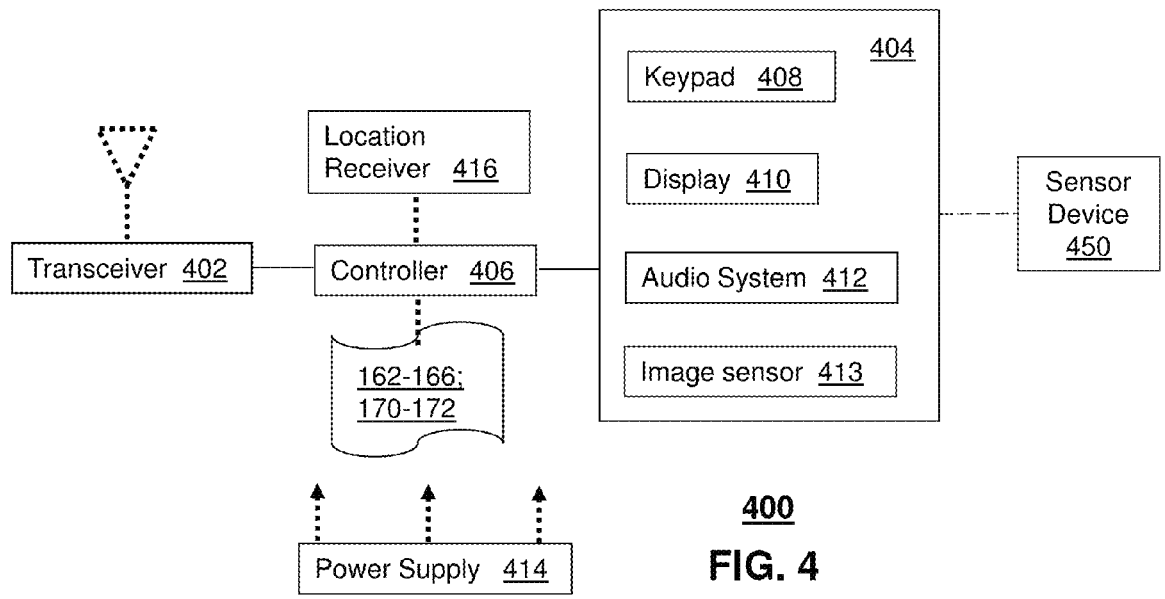
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be coupled to a sensor device 450 which captures sensory information associated with an environment, such as environment 101 of FIG. 1. The sensory information can be of various types and can be captured by corresponding types of detection devices. For example, the sensory information can be one or more of images, audio, temperature, weather, lighting, color, location information, time, season of the year, and aroma associated with the environment. The coupling of the sensor device 450 with the communication device 400 can be of various types, including: the sensor device being integrated in the communication device, the sensor device being tethered or otherwise connected via a hardwire to the communication device and/or the sensor device being wirelessly in communication with the communication device. The exemplary embodiments can also include the image sensor 413, the audio system 412 and/or the location receiver 416 functioning as the sensor device 450. The exemplary embodiments also provide for the communication device 400 capturing multiple types of sensory information. For example, the sensor device 450 can be a lighting detector that provides lighting information associated with the environment, along with images captured by the image sensor 413 and audio captured by the audio system 412.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Illustrative embodiments of methods that can operate in portions of the communication device of FIG. 4 are described below.

Figure 5:
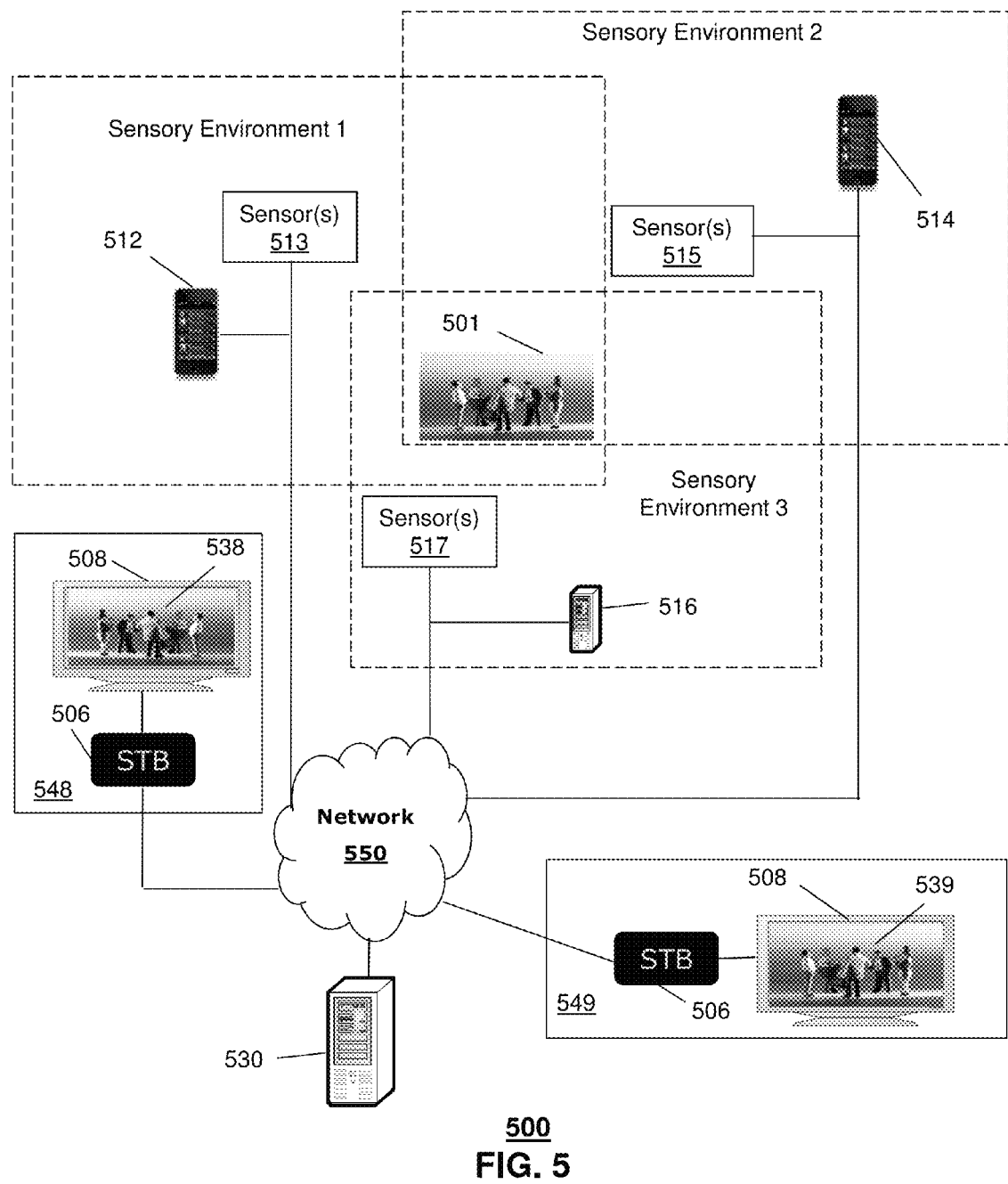
FIGS. 5-6 depict illustrative embodiments of communication systems that provide media services.

FIG. 5 depicts an illustrative embodiment of a system 500 for gathering sensory information associated with an environment 501 and generating media content based on the gathered sensory information. System 500 can be overlaid or operably coupled to communication systems 100-200 as another representative embodiment of communication systems 100-200. System 500 can include a server 530 in communication with media processors 506 (such as set-top boxes), communication device 516 (such as a laptop computer, a server, etc.), and mobile wireless communication devices 512 and 514 (such as mobile phones, smart phones, etc.). The mobile communication devices 512 and 514 can be communicatively coupled to the server 530 by way of a network 550 (e.g., a mobility network) coupled to the Internet or other communication means. The communication device 516 can also be communicatively coupled to the server 530 by way of the Internet or other communication means.

In this example, a first mobile communication device 512 can be coupled with one or more sensor devices 513 for capturing sensory information associated with the sensory environment 1. A second mobile communication device 514 can be coupled with one or more sensor devices 515 for capturing sensory information associated with the sensory environment 2. A fixed communication device 516 can be coupled with one or more sensor devices 517 for capturing sensory information associated with the sensory environment 3. The sensors 513, 515 and 517 can be in proximity to the environment 501 in order to capture the sensory information of the environment 501. As shown in FIG. 5, the sensory environments 1, 2 and 3 can overlap each other and encompass all or a portion of the environment 501 to facilitate capturing sensory information associated with the environment 501 that provides a full or more encompassing perspective of the environment 501.

The sensors 513, 515 and 517 can be of various numbers and can use various components, to capture various types of sensory information including images, audio, temperature, weather, lighting, color, location information, time, season of the year, and aroma associated with the environment 501. While system 500 depicts three devices that are utilized for capturing sensory information associated with environment 501, it should be understood that any number of devices, including mobile and/or fixed communication devices can be used for gathering sensory information for generating media content.

In one embodiment, the mobile communication device 512 can broadcast a wireless signal which is received by the mobile communication device 514 and the fixed communication device 516. The wireless signal can be a notice to obtain sensory information associated with the environment 501. The notice can advise other devices, including the mobile communication device 514 and the fixed communication device 516, that mobile communication device 512 is utilizing sensor 513 to capture sensory information associated with the environment 501, such as capturing still or moving images of the environment 501. The notice can also request sensory information associated with the environment 501 from other devices, including the mobile communication device 514 and the fixed communication device 516. The broadcast signal can be of various types utilizing various communication protocols. For example, the mobile communication device 512 can be a multi-mode communication device and the wireless notice signal can be broadcast using a number of different communication protocols (simultaneously and/or serially) so that different devices operating under different communication protocols can be put on notice of the capture of the sensory information and/or the request for sensory information. In one embodiment, the broadcast notice signal can be a mid-range wireless signal (e.g., 100 meters).

The receipt of sensory information from other devices, including the mobile communication device 514 and the fixed communication device 516, can be performed in a number of different ways. For instance, sensory information can be exchanged between devices, such as the mobile communication device 512 transmitting sensory information captured by sensors 513 to the mobile communication device 514 while the mobile communication device 514 is transmitting sensory information captured by sensors 515 to the mobile communication device 512. In one embodiment, the sharing or otherwise providing of sensory information can be done based on an opt-in procedure in response to broadcast of the notice. In one embodiment, the providing of sensory information can be performed while maintaining anonymity of users associated with the communication devices, such as mobile communication devices 512 and 514 and fixed communication device 516.

In one embodiment, obtaining sensory information can be negotiated. For example, the mobile communication device 512 can transmit the notice which is received by the fixed communication device 516. The fixed communication device 516 can agree to transmit sensory information captured by sensor 517. The agreement to send the sensory information captured by sensor 517 can be based on a number of factors in the negotiation. For example, the user of the mobile communication device 512 may have a subscription to services provided by a service provider affiliated with the fixed communication device 516. For instance, the environment 501 may be a concert in a park where a service provider is operating a fixed communication device 516 to capture video and audio of the concert for broadcast over a channel of the service provider. The user of the mobile communication device 512 may have a subscription for media services provided over the service provider channel. The fixed communication device 516 can provide the sensory information captured by the sensor 517 to the mobile communication device 512, which in this case is the video and audio of the concert in the park. Media content can then be generated based on the video and audio content, as well as other sensory information captured by sensor 513 and/or received from mobile communication device 514 (which is captured by sensor 515). As an example, the media content can be a presentation of the concert but from one or more viewing angles that differ from the viewing angles utilized by the sensor 517 of the fixed communication device 516 when capturing the video content. In this example, media content can be generated based on the concert in the park, but where the media content differs, in whole or in part, from that which is broadcast by the service provider. The differences can be managed or otherwise determined by the user of the mobile communication device 512, such as based on user preferences, device capabilities and so forth.

In one embodiment, the exchange of sensory information can be performed in a daisy chain fashion so that the sensory information does not need to be received directly from a mobile device that captured the sensory information, but rather can be forwarded from a mobile device that received the sensory information from another mobile device. In this example, the use of the daisy chain techniques can enhance the ability to capture varying perspectives of the environment 501.

System 500 allows for the generation of media content based on the sensory information that has been captured with respect to environment 501. For example, mobile communication device 512 can gather sensory information which is used for presenting first media content 538 at location 548. The first media content can be generated by one or more of the mobile communication device 512, the server 530 and the STB 506. The first media content can be generated based on some or all of the sensory information captured by one or more of sensors 513, 515 and 517. Mobile communication device 514 can gather sensory information which is used for presenting second media content 539 at location 549. The second media content can be generated by one or more of the mobile communication device 514, the server 530 and the STB 506. The second media content can be generated based on some or all of the sensory information captured by one or more of sensors 513, 515 and 517. Although the first and second media content 538 and 539 may be similar because they are generated utilizing the same pool of sensory information, there can be differences, including viewing angles, portions of images or other sensory information presented, and so forth. These differences can be selected based on user preferences, including user profiles, monitored user behavior, and so forth.

Figure 6:
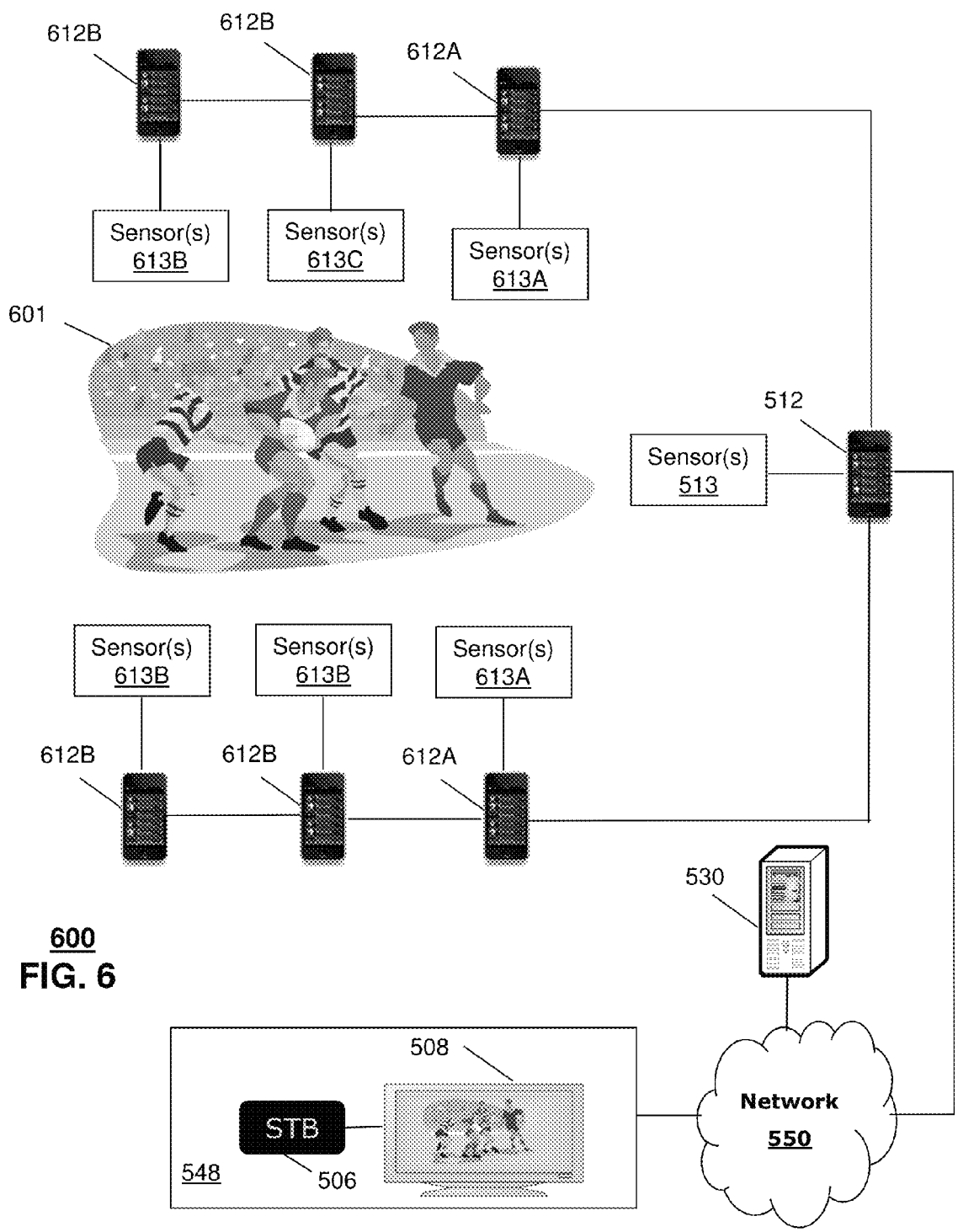

FIG. 6 depicts an illustrative embodiment of a system 600 for gathering sensory information associated with an environment 601 and generating media content based on the gathered sensory information. System 600 can be overlaid or operably coupled to communication systems 100-200 and 500 as another representative embodiment of communication systems 100-200 and 500. System 600 can include a server 530 in communication with media processors 506 (such as set-top boxes) and mobile wireless communication devices 512 and 612 (such as mobile phones, smart phones, etc.). The mobile communication devices 512 and 612 can be communicatively coupled to the server 530 by way of a network 550 (e.g., a mobility network) coupled to the Internet or other communication means. Media content can be presented at location 548 using the display device 508.

In this example, a first mobile communication device 512 can be coupled with one or more sensor devices 513 for capturing sensory information associated with the environment 601. The first mobile communication device 512 can be in communication with second mobile communication device 612A which are coupled with one or more sensor devices 613A for capturing sensory information associated with the environment 601. The second communication devices 612A can be in communication with other second communication devices 612B which are coupled with one or more sensor devices 613B or 613C for capturing sensory information associated with the environment 601. In this example, a daisy chain process is utilized to provide first mobile communication device 512 with access to a greater pool of sensory information. In this example, first mobile communication device 512 can receive sensory information captured by sensors 613A and 613B from second mobile communication devices 612A without needing to communicate with any of the other second mobile communication devices 612B. As also shown by this example, access to sensory information can be selectively controlled, including by the mobile device that captured the sensory information and/or the mobile device that is transmitting the sensory information. For example, first mobile communication device 512 can receive via second communication devices 612A, the sensory information captured by sensors 613B without receiving the sensory information captured by sensor 613C. In this example, the mobile communication device 612B that is coupled with sensor 613C can forward other sensory information that it receives without sending the sensory information that it retrieves from its own sensor 613C. Whether sensory information is shared with other devices can be controlled by various entities according to various procedures. For example, a mobile device may agree to exchange sensory information with another mobile device subject to the sensory information not being further distributed to other mobile devices.

Figure 7:
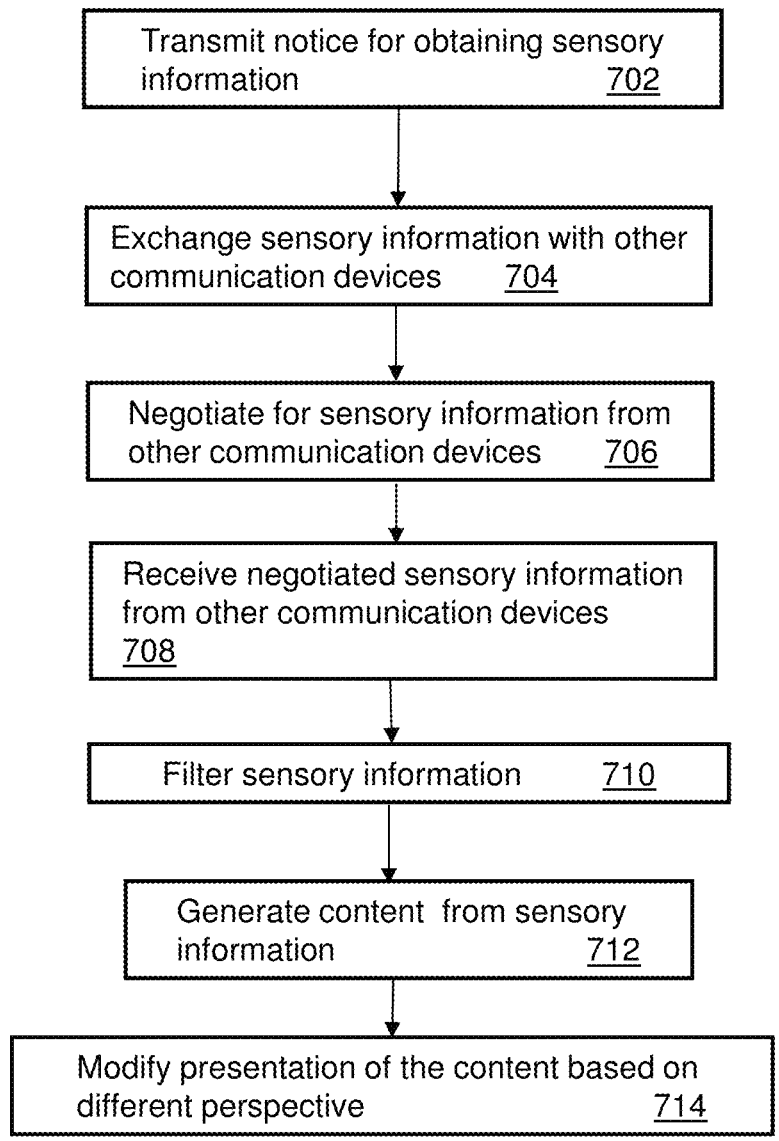
FIG. 7 depicts an illustrative embodiment of a method operating in portions of the systems described in FIGS. 1-6.

FIG. 7 depicts an illustrative method 700 that operates in portions of the devices of FIGS. 1-6. Method 700 can begin with step 702 in which a mobile communication device transmits a notice to obtain sensory information associated with an environment, such as images, audio and so forth. Based on the notice, other communication devices, including fixed and/or mobile devices, can opt-in or opt-out of providing and/or receiving sensory information. In step 704, devices desiring to participate, can exchange sensory information with the mobile communication device and/or can provide sensory information to the mobile communication device without receiving sensory information in return. The exchange of sensory information can be performed with controls on the distribution of the sensory information, such as permitting use of the sensory information in media content generated by a recipient device but prohibiting further distribution of the sensory information to other devices.

In step 706, the mobile communication device can negotiate to obtain other sensory information, such as requesting sensory information from an entity operating a security camera in proximity to the environment. The negotiation can be based on various criteria, such as payment, exchange of sensory information, establishing a relationship with an entity operating the other communication device (such as becoming a member affiliated with the entity) and so forth. In one embodiment, the negotiation can be based on future or past exchanges of sensory information. For instance, a communication device can agree to presently provide sensory information to the mobile communication device if the mobile communication device agrees to exchange sensory information in the future (in the event that the two devices again cross paths in a particular environment). In step 708, the negotiated sensory information can be received from the other communication devices.

The gathered sensory information can be filtered in step 710 by any number of devices, including the mobile communication device, a remote server, an STB associated with the mobile communication device and so forth. The filtering can be performed based on various criteria, including user preferences, parental controls, digital rights management (e.g., detecting that some of the sensory information is subject to proprietary rights of another), and so forth.

The media content can be generated in step 712 based on some or all of the pool of sensory information that has been gathered. In step 714, the presentation of the media content can be adjusted using portions of the sensory information that provides a different perspective of the environment. In one embodiment, editing of the media content can be performed in a number of different ways, such as piecing together a user's life from a default perspective (e.g., primarily front view) to create a live scrap book, while other perspectives remain hidden where the user can launch the other perspectives such as when pausing a segment or otherwise requesting a different perspective. The perspectives can include a view from afar (e.g., sensor from building 100 meters away), a view from behind (bystander sensor captures view from behind), a view from friends or family while in a group setting. In one embodiment, if there is a stadium or concert hall recording (e.g., football, baseball, soccer, concert, etc.), a user can request views throughout the stadium based on the presence of other mobile communication device throughout the stadium.

In one embodiment, the media content can be generated into 3D images from 2D images captured by the sensors. The remote server, the mobile communication device, the STB and/or some other device can utilize the different viewing angles provided by different images of the sensory information to generate 3D content and/or holographic content. In another embodiment, a depth map can be utilized to generate the 3D content.

The media content can also be generated using other information. For example, media content can be generated based on a user watching his or her child's baseball game at a ball field. Other media content, such as images of professional ball players, and clips of professional announcers which correspond to action occurring during the child's game can be spliced or otherwise combined with the media content generated from the sensory information. Additionally, media content previously generated by the user and/or sensory information previously gathered that is related to the child's baseball game can be spliced or otherwise combined with the media content generated from the present sensory information, such as adding images of the child from earlier games when similar plays were made or images showing the age progression of the child.

Figure 8:
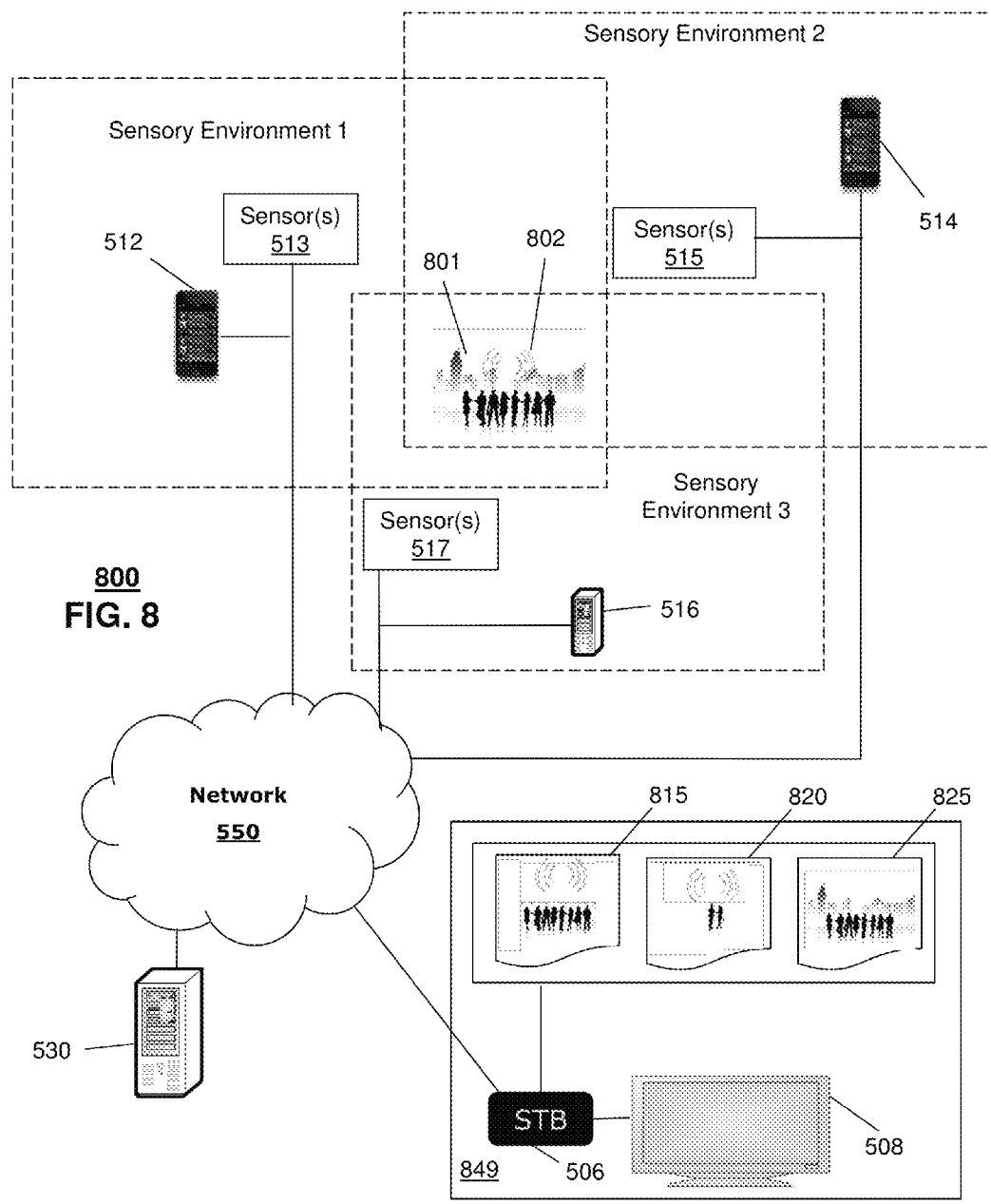
FIG. 8 depict illustrative embodiments of a communication system that provides media services.

FIG. 8 depicts an illustrative embodiment of a system 800 for gathering sensory information associated with an environment 801 (having audio 802) and generating media content based on the gathered sensory information. System 800 can be overlaid or operably coupled to communication systems 100-200 and 500-600 as another representative embodiment of communication systems 100-200 and 500-600. System 800 can include a server 530 in communication with media device or processor 506 (such as set-top boxes) and mobile wireless communication devices 512 and 514 (such as mobile phones, smart phones, etc.), as well as fixed communication device 516. The mobile communication devices 512 and 514 and the fixed communication device 516 can be communicatively coupled to the server 530 by way of a network 550 (e.g., a mobility network) coupled to the Internet or other communication means. Media content can be presented at location 849 using the display device 508.

In this example, sensory information can be obtained from the various communication devices in proximity to the environment 801, such as mobile devices 512 and 514 and fixed device 516. The media device 506 can then generate a plurality of personal content, shown as content 815, 820 and 825, from the sensory information. In the exemplary embodiment, the media device 506, such as an STB, is generating the plurality of content. However, it should be understood that the media device 506 can be a number of different devices (such as a personal computer, smart phone, etc.). Additionally, other devices can be used for generating all or some of the plurality of personal content (including portions of one or more of the personal content), including the server 530 and/or other media devices associated with other users.

The personal content 815, 820 and 825 can be different versions of the content generated from portions of the sensory information. The different versions of the personal content can be based on criteria established or otherwise associated with the user seeking to generate the personal content. For example, a user profile can be used to piece together the personal content from the sensory information. Monitored viewing behavior, as well as previously generated personal content, can be used for generating the plurality of different versions. The user can also define the criteria for generating the personal content, such as target individuals, sounds, objects, time and so forth to be included in the personal content to the extent that the sensory information has captured these criteria. In personal content 815, audio for one or more individuals in the content can be included. The sensory information can be analyzed to provide images of the individuals without background images. In personal content 820, the perspective of the sensory information (e.g., the viewing angle and zoom) can be selected so that only select individuals are shown while there audio is only heard without the audio of others in the environment. This can be accomplished by reviewing the sensory information and selecting sensory information captured by sensor devices that provide the desired viewing angle and desired audio output. Personal content 825 can provide a complete panoramic perspective of the environment, with or without the accompanying audio.

The different versions of the personal content can be accessed by different requestors based on a number of factors. In one embodiment, a relationship between the user who generated the personal content and the requestor can be determined and utilized to provide or deny the access. For instance, relationships such as immediate family, family, close friends, friends, acquaintances can be used to determine if access can be granted. In one embodiment, the user can customize the relationships including providing monitorable definitions, such as an acquaintance becoming a friend when it is determined that a threshold number of messages have been exchanged between the user and the acquaintance. Different channels can be provided by a service provider to view the different versions of the content.

Figure 9:
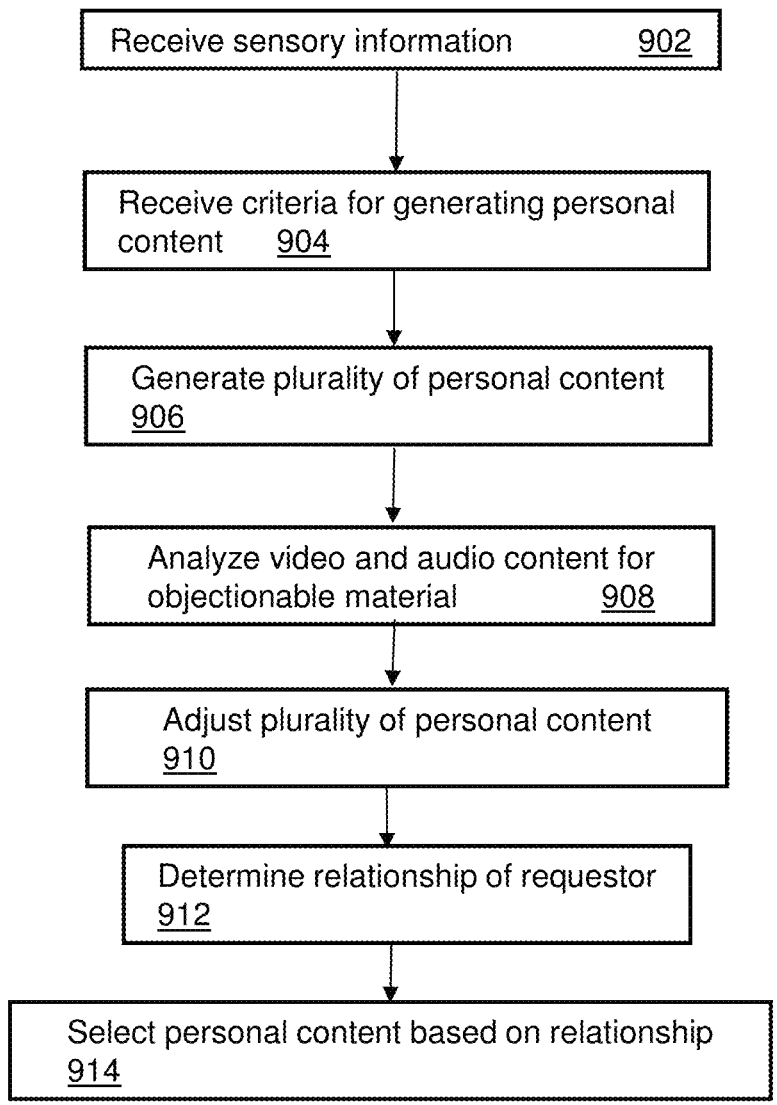
FIG. 9 depicts an illustrative embodiment of a method operating in portions of the systems and methods described in FIGS. 1-8.

FIG. 9 depicts an illustrative method 900 that operates in portions of the devices and methods of FIGS. 1-8. Method 900 can begin with receiving sensory information at 902. The sensory information can be received at a media device, such as an STB, and/or can be received at another device that generates personal content, such as remote server 130. The sensory information can be associated with an environment and received from various devices including a mobile device associated with the media device, mobile device(s) not associated with the media device and/or fixed communication devices. The sensory information can be received via the related mobile device and/or directly from the other communication devices.

At 904, criteria for generating personal content can be obtained. For instance, the user can input criteria in a user interface of the media device. As another example, the criteria can be established based on a user profile and/or based on monitored viewing behavior of the user and/or previous personal content that was generated. In one embodiment, the criteria can be independent of the preferences of the user, such as based on parental controls or based on an automatic generation algorithm. At 906, a number of different versions of the personal content can be generated based on the criteria. The different versions can include the same or different portions of the sensory information, such as images from different viewing angles, different audio, and so forth. The different versions can also be directed towards different target audiences. For example, an immediate family version can be generated that provides close-up images and audio of the user with a limited amount of images and audio from other individuals. In one embodiment, versions can be target to particular individuals. For example, a version of the personal content may be generated that includes all of the images and audio of the user and his friend, while limiting images and audio of other individuals.

At 908, the media device or another component can analyze the video and/or audio of each of the personal content for objectionable material. For instance, the analysis can be automatic without user interaction, based on image and speech recognition. The analysis can be based on user interaction and/or the version of the personal content that is being generated. For example, certain images or words may be objectionable in the family version of the personal content but may be acceptable in the friend's version of the content. At 910, one or more versions of the personal content can be adjusted based on objectionable material, as well as based on other criteria. In one embodiment, the audio generated from certain individuals may be muted. In another embodiment, the images of certain individuals may be obscured or otherwise blocked. The muting and/or obscuring can be based on objectionable material, user preferences, agreement negotiated with one or more suppliers of the sensory information, and so forth. For instance, a second mobile communication device may agree to provide sensory information that includes images provided that images of the user of the second mobile communication device are obscured in the personal content.

At 912, a request for personal content can be received and a determination of a relationship between the requestor and the generator of the personal content can be made. The relationship can be of many forms, including business and personal, and can be customized or automatically defined. At 914, access to personal content can be granted or denied based on a determined relationship of a requestor. The access can be provided in a number of different ways, such as via channels in an interactive television network (e.g., IPTV), streaming between media devices, and so forth.

In one embodiment, the gathering of sensory information from other communication devices can be based on a location of the particular other devices. For example, priority of retrieving sensory information can be utilized in order to enable gathering sensory information from a limited viewing angle. For instance, where a first group of devices are located in close proximity and a second group of devices are located remotely from each other, gathering of the sensory information from the second group of devices can be given priority to enable obtaining a wider perspective or viewing angle of the environment. The use of prioritization for gathering sensory information can be particularly helpful where a mobile communication device has limited storage capacity and/or limited time to negotiate an exchange of sensory information. By prioritizing the gathering of sensory information to target devices having better perspective over an environment, personal content can be generated with improved perspective.

Upon reviewing the aforementioned embodiments, it would be evident to an artisan with ordinary skill in the art that said embodiments can be modified, reduced, or enhanced without departing from the scope and spirit of the claims described below. The exemplary embodiments can perform collection of sensory information utilizing a number of different sources, including sensors carried by a user, fixed sensors in building and street infrastructure, sensors carried by friends and family, sensors carried by bystanders, and so forth. The device discovery and/or sharing of sensory data can be performed utilizing a number of different techniques, such as a user broadcasting a mid-range signal (e.g., 100 meters) indicating the user is recording his/her life, devices with sensors in proximity can detect the broadcast, devices can respond with opt-in or opt-out response to share data, user of device may identify him/herself or remain private (e.g., friends and family can identify themselves while bystanders and fixed infrastructure sensors remain anonymous.

In one embodiment, discovery of devices can be daisy chained so that a user can build up a broader collection of sensory data, such as a user in a sports complex or concert hall discovering devices nearby and requesting a recording of the experience in the user's proximity and throughout the sports complex or concert hall. In this example, sensors can opt-in or opt-out, and information can be shared by daisy chain or by transmission on a data channel (e.g., 3G or 4G) to a server. Organizing of the collected sensory information can be performed in a number of different ways, such as based on an order of priority including vicinity to user, friends and family, and perspectives (e.g., front, back, side, rear). The filtering of sensory information can be performed in a number of different ways such as quality of sensory data, including clarity visually, clarity audibly, identify portions that can be live, and identify portions that can be still images.

Figure 10:
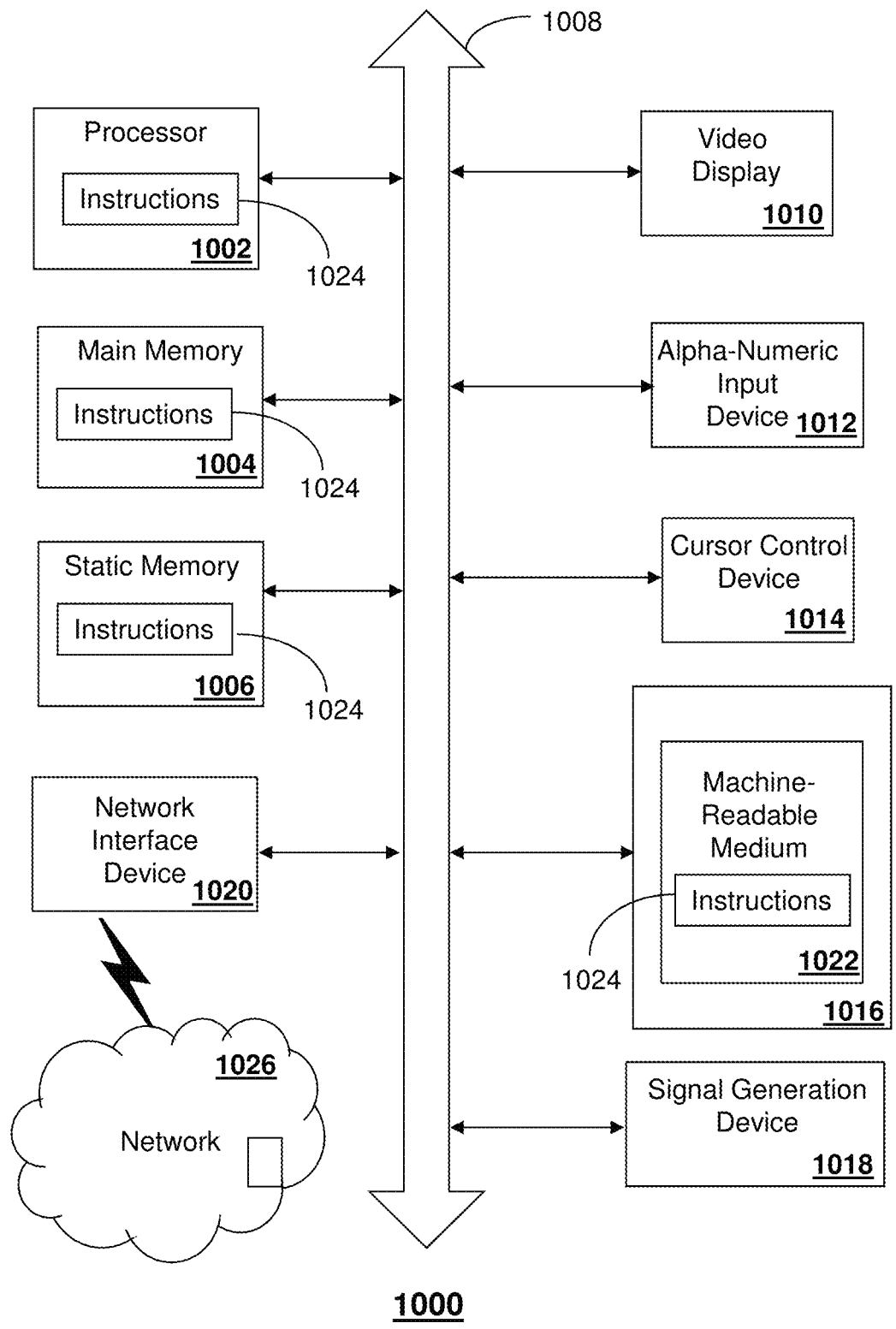
FIG. 10 is a diagrammatic representation of a machine in the form of a computer system within which a set of instructions, when executed, may cause the machine to perform any one or more of the methods discussed herein.

FIG. 10 depicts an exemplary diagrammatic representation of a machine in the form of a computer system 1000 within which a set of instructions, when executed, may cause the machine to perform any one or more of the methods discussed above. One or more instances of the machine can operate, for example, as the server 530, the media processor 506, the display 508, the fixed communication device 516, mobile devices 512, 514, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a memory that stores executable instructions; and
a controller coupled to the memory, wherein the controller, responsive to executing the instructions, performs operations comprising:
receiving, from a first communication device of a plurality of communication devices, sensory information representing characteristics of a first environment of the first communication device, wherein a first portion of the sensory information is captured by a sensor coupled to a second communication device located in a second environment in response to the first communication device broadcasting a notice requesting sensory information from other devices of the plurality of communication devices, wherein a broadcasting signal strength of the notice is selected based on characteristics of the first environment determined by the first communication device,
wherein the first portion of the sensory information captured by the sensor represents a characteristic of the second environment in common with the first environment, and wherein a second portion of the sensory information is obtained by the first communication device from the first environment; and
generating media content based on the sensory information.

2. The device of claim 1, wherein the first portion of the sensory information is obtained by the first communication device via an exchange of sensory information between the first communication device and the second communication device.

3. The device of claim 2, wherein the exchange is in accordance with an agreement between the first communication device and the second communication device, and wherein the agreement comprises a restriction on distribution of the sensory information to other devices.

4. The device of claim 2, wherein the exchange comprises a business transaction between entities associated with the first communication device and the second communication device respectively.

5. The device of claim 1, wherein the first communication device obtains the sensory information from the second communication device while maintaining anonymity of a user associated with the second communication device.

6. The device of claim 3, wherein the media content comprises an image, wherein the operations further comprise obscuring a portion of the image, and wherein the obscuring is performed in accordance with the agreement.

7. The device of claim 1, wherein the sensory information comprises still images, moving images, audio, temperature, weather, lighting, color, location information, time, season of the year, or aroma associated with the first environment or the second environment.

8. The device of claim 1, wherein the second communication device is in communication with a third communication device of the plurality of communication devices, wherein a third portion of the sensory information is captured by a sensor coupled with the third communication device and is obtained by the second communication device from the third communication device, and wherein the third portion of the sensory information is obtained by the first communication device from the second communication device without the first communication device communicating with the third communication device.

9. The device of claim 1, wherein the first communication device is a mobile multi-mode communication device.

10. The device of claim 9, wherein the plurality of communication devices use a plurality of different communication protocols, and the notice is broadcast using the plurality of different communication protocols.

11. The device of claim 9, wherein the notice advises the plurality of communication devices regarding a type of information captured by a first sensor coupled with the first communication device.

12. A method comprising:
receiving, by a device, sensory information representing characteristics of a first environment of a first communication device of a plurality of communication devices, wherein the sensory information is captured by a plurality of sensors coupled with the plurality of communication devices, wherein a first portion of the sensory information is captured by a sensor coupled to a second communication device located in a second environment in response to a notice broadcast by the first communication device requesting sensory information from other devices of the plurality of communication devices, wherein a broadcasting signal strength of the notice is selected based on characteristics of the first environment determined by the first communication device, wherein the first portion of the sensory information captured by the sensor represents a characteristic of the second environment in common with the first environment, wherein a second portion of the sensory information is obtained by the first communication device from the first environment;
receiving, by the device, first criteria for generating media content from the sensory information;
generating, by the device, the media content in accordance with the first criteria, the media content comprising an image;
analyzing, by the device, the media content in accordance with second criteria; and
adjusting, by the device, the media content based on the analyzing.

13. The method of claim 12, wherein the media content comprises an image, and wherein the adjusting comprises obscuring a portion of the image.

14. The method of claim 12, wherein the first portion of the sensory information is obtained by the first communication device via an exchange of sensory information between the first communication device and the second communication device, and wherein the exchange is based on an agreement between the first communication device and the second communication device.

15. The method of claim 14, wherein the sensory information comprises an image, and wherein the agreement provides that a portion of the image obtained by the first communication is obscured.

16. The method of claim 14, wherein the exchange comprises a business transaction between entities associated with the first communication device and the second communication device respectively.

17. A method comprising:
transmitting, by a first communication device of a plurality of communication devices, a notice via a broadcast signal to a second communication device requesting sensory information representing characteristics of a first environment of the first communication device, the sensory information captured by a sensor coupled with the second communication device, the second communication device being located in a second environment,
wherein a signal strength of the broadcast signal is selected based on characteristics of the first environment determined by the first communication device,
wherein the sensory information is captured by the sensor in response to the notice and represents a characteristic of the second environment in common with the first environment;
obtaining, by the first communication device, the sensory information via an exchange between the first communication device and the second communication device; and
providing, by the first communication device, the sensory information to a media device for generation of media content, the media device being remote from both the first environment and the second environment.

18. The method of claim 17, wherein the first communication device transmits the notice using a communication protocol of the second communication device.

19. The method of claim 17, wherein the exchange comprises a business transaction between a first entity associated with the first communication device and a second entity associated with the second communication device.

20. The method of claim 17, wherein the first communication device obtains the sensory information from the second communication device while maintaining anonymity of a user associated with the second communication device.

* * * * *